United States Patent Office 3,364,137
Patented Jan. 16, 1968

3,364,137
LOW PRESSURE REFORMING PROCESS UTILIZING HIGH PURITY HYDROGEN
Harold W. Bergendorf, Arlington Heights, and Anthony G. Lickus, Mount Prospect, Ill., assignors to Universal Oil Products Company, Des Plaines, Ill., a corporation of Delaware
No Drawing. Continuation-in-part of abandoned application Ser. No. 382,348, July 13, 1964. This application June 9, 1966, Ser. No. 556,252
8 Claims. (Cl. 208—139)

The present application is a continuation-in-part of our copending application Ser. No. 382,348, filed July 13, 1964, now abandoned.

This invention relates to the catalytic conversion of hydrocarbon fractions containing naphthenes and paraffins. This invention more specifically relates to improvements in the operation of reforming processes which result in enhanced yield of reformate. Still more specifically, this invention relates to a novel manner of processing the charge stock and required hydrogen through a bed of reforming catalyst at a particular low pressure range so as to produce a reformate of enhanced yield and/or a more stable catalyst. This invention further relates to a particular low pressure method of reforming gasolines and naphthas in the presence of hydrogen and a catalyst comprising at least one refractory oxide and a metal component selected from the group consisting of the metals and compounds of the metals in the platinum group which comprises correlating the boiling point range of the feed stock with the operating pressure maintained in the catalyst bed.

The overall effect of the numerous reactions that occur in a reforming reactor including such as dehydrogenation of naphthenes, hydrocracking of paraffins, isomerization of paraffins and sometimes dehydrocyclization of paraffins generally is in the net production of hydrogen and light hydrocarbons. There is a net production of effluent gas comprising hydrogen, methane, ethane, propane, butane, etc., and conventional reforming units recycle a portion of said effluent gas back to the reaction zone to provide a sufficient hydrogen to oil ratio to prevent undesirable side reactions and preserve catalyst activity (stability). The recycle gas inherently contains hydrocarbon components such as methane, ethane, propane, butane, butene and even pentane and pentene depending primarily upon the separation vessel pressure and temperature since there is an equilibrium separation of the normally liquid reformate from the normally gaseous reactor effluent by means of a phase separation vessel. Therefore, since the recycle gas contains hydrocarbon impurities, these impurities may enter into further (and undesirable) reactions upon returning to the reaction zone. For example, it is known that the presence of significant amounts of olefins such as ethene, propene and butene in the recycle gas result in an increased catalyst deactivation rate probably due to increased rates of carbon or carbonaceous material forming reactions. It has been found that if substantially pure hydrogen is processed through a reforming catalytic reaction zone concurrently along with the charge stock at a given hydrogen to hydrocarbon mol ratio, lower catalyst deactivation rates occur. Substantially pure hydrogen may be obtained by recycle gas purification such as selective adsorption or cryogenic separation or by passing hydrogen from a hydrogen manufacturing plant once-through the reforming zone. It is known in the prior art that lower pressures result in increased catalyst deactivation rates. In some cases the catalyst deactivates so fast that the catalyst quickly loses its ability to attain the more favorable equilibrium limitation that low pressures afford. It has been found, however, that the simultaneous lowering of the reactor pressure and the processing of substantially pure hydrogen will give greater reformate yields at a constant catalyst deactivation rate than will a conventional high pressure impure recycle gas reforming process scheme.

In one of its embodiments this invention relates to a process for the reforming of a hydrocarbon charge stock containing paraffins and naphthenes which comprises: introducing said hydrocarbon charge stock into a reforming catalyst reaction zone at temperatures sufficient to maintain reforming reactions, introducing substantially pure hydrogen to said reaction zone such that said charge stock and said hydrogen pass concurrently through the reaction zone, maintaining relatively low pressures correlated with the boiling point of the charge stock in said reaction zone, and withdrawing a stream comprising a normally liquid reformed hydrocarbon fraction and a normally gaseous fraction depleted in hydrogen purity.

In another of its embodiments this invention relates to the improvement in a reforming process of passing substantially pure hydrogen through a bed of reforming catalyst along with the hydrocarbon charge stock while maintaining a pressure selected within the range bounded by the equations $y=0.833x-14$ and $y=x-150$ where $x$ is the temperature in ° F. of the 95% point of the charge stock on an Engler distillation curve being limited from 200° F. up to 400° F. and $y$ is the pressure in p.s.i.g. being limited from 50 to 300 p.s.i.g. and other reforming reaction conditions in said bed.

In still another of its embodiments this invention relates to an improved reforming process which comprises passing substantially pure hydrogen through a bed of reforming catalyst along with a hydrocarbon charge stock while maintaining reforming reaction conditions and a pressure calculated from the equation $y=1.28x-190$ where $x$ is the temperature in ° F. of the 95% point of the charge stock on an Engler distillation curve being limited from 200° F. up to 400° F. and $y$ is the pressure in p.s.i.g. being limited from 50 to 300 p.s.i.g.

In a more specific embodiment this invention relates to a method for increasing the ratio of isopentane to normal pentane in a reformate which comprises passing substantially pure hydrogen through a bed of reforming catalyst along with a hydrocarbon charge stock while maintaining low pressure correlated with the boiling point of the charge stock in said bed.

The area of reforming of gasolines and naphthas has been well known for many years. For example, in U.S. Letters Patent No. 2,478,916, issued on Aug. 16, 1949, a reforming process employing a platinum catalyst is disclosed. There are numerous desirable reactions that occur in a properly operating reforming reactor. One of the basic reactions is the dehydrogenation of naphthenes to aromatics with a resulting increase in octane number and the evolution of 3 moles of hydrogen per mole of naphthene dehydrogenated. Another basic reaction is the isomerization of paraffin molecules such as the conversion of normal hexane to 3-methylpentane, 2,3-dimethylbutane, etc. This reaction generally involves an increase in octane number since the normal molecules have low octane numbers and are present in straight run naphthas in greater than equilibrium concentrations with respect to their isomers at reforming conditions. Another basic reaction is the hydrocracking of paraffins such as the conversion of decane into methane and nonane or ethane and octane, or propane and heptane, etc. Generally a lower weight hydrocarbon of the same molecular structure has a higher octane number than a higher weight hydrocarbon. Thus, normal pentane has an octane number of 61.7 F-1 clear whereas normal hexane has an octane number of 24.8 F-1 clear. Therefore, although hydrocracking increases the octane number, it also has the undesirable characteristics of decreasing the liquid yield of reformate since methane, ethane and propane are too light and volatile to be useful in gasolines for conventional internal combustion engines and consuming one mole of hydrogen per mole of hydrocarbon hydrocracked. Furthermore, hydrocracking also dilutes the purity of the hydrogen in the gaseous effluent since it produces light normally gaseous hydrocarbons. Another reaction that frequently occurs in reforming reactors is the dehydrocyclization of paraffins to aromatics resulting in a substantial increase in octane number and the evolution of 4 moles of hydrogen per mole of paraffin reacted. Although this latter reaction is probably the most desirable, it is the slowest of the reactions and depending upon the operating conditions in the reactor and the charge stock, it may either not occur at all or may occur in substantial amounts.

It is possible for several undesirable reactions also to occur in a reforming reactor. Examples are ring opening such as the conversion of a naphthene to a paraffin which consumes 1 mole of hydrogen per mole of reacted naphthene. Another undesirable reaction is the production of carbon and/or carbonaceous materials. This latter reaction generally results in the loss of activity and selectivity of the reforming catalyst since these materials are retained in the reaction zone and build up on the catalyst. It is expected that some of these carbonaceous materials are due to the build up of high molecular weight polynuclear aromatics in successive stages from the desirable mononuclear aromatics by means of successive reactions resulting in increases in the molecular ratio of carbon to hydrocarbon. At some point in the build up by polymerization or other kinds of reactions these materials pass from the broad class of material called hydrocarbons to the broad class of materials called carbonaceous. The border is not clearly defined however. These carbonaceous materials, when deposited upon reforming catalysts, result in loss of catalytic activity and selectivity. It is possible that these polynuclear carbonaceous deposits are a worse catalyst poison than amorphous carbon because of the extent of carbon to carbon bonding of the polynuclears effectively blocking the reactants from contacting the catalyst.

Generally, the desired reactions hereinbefore described, except perhaps hydrocracking, are promoted by decreases in the reactor pressure. However, the undesirable carbonaceous material forming reactions are also promoted by lower pressures. In addition, low hydrogen purities in the normally gaseous phase or low hydrogen to oil molar ratios also promote the formation of the carbonaceous material. Thus in a particular case the yield of reformate can be increased by lowering the pressure but also the rate of catalyst deactivation will increase. Generally as the catalyst deactivates it is necessary to increase the reactor temperature to maintain octane number. Increases in temperature also accelerate the rate of catalyst deactivation. This can result in lower yields and the overall net effect may be that by lowering the pressure as mentioned above, the yield of reformate over the life of the catalyst may actually be lower than that which would have been obtained by maintaining higher pressures. Therefore the yield advantage gained by lowering the pressure may actually result in a yield disadvantage over a substantially short period of time.

Since reforming reactions generally produce net hydrogen and light hydrocarbons (methane, ethane, propane, etc.) a common practice has been to recycle a portion of the effluent separator gas to supply the required hydrogen to oil mole ratio by means of a recycle compressor. The use of the recycle hydrogen also requires the recycling of light hydrocarbons such as methane and ethane, propane, butane, pentane and their respective trace quantity olefins. This allows these light hydrocarbons to further react in the reaction zone which can aid in increased rates of catalyst deactivation.

One of the significant components of reformates is pentane. Generally only two isomers are produced in appreciable quantities, namely, normal pentane and isopentane. It is preferable to produce the isopentane because of its high octane number (92.3) instead of the normal pentane with its accompanying lower octane number (61.7). However, the ratio of isopentane to normal pentane in conventionally produced reformates is generally within the range of 1.2 to 1.6. Significant improvement in the operation of a reformer can be made such as improved yield and lower deactivation rate of catalyst if said ratio could be increased.

It is an object of this invention to present an improved method for reforming a hydrocarbon charge stock containing naphthenes and paraffins while reducing the effect of the above-mentioned problems. It is a further object of this invention to reduce the catalyst deactivation rate while allowing reduction in the reactor zone operating pressure thus allowing increased yield of reformate. It is a more specific object of this invention to minimize recycling of normally gaseous light hydrocarbons back to a reforming reaction to thereby enhance the stability of the reforming catalyst. It is another more specific object of this invention to process substantially pure hydrogen through a low pressure reforming reactor said pressure being correlated with the boiling point of the charge stock to thereby enhance the yield of reformate. It is a further more specific object of this invention to increase the isopentane to normal pentane ratio in the reformate.

The term reformate as used herein is hereby defined to mean the normally liquid hydrocarbon effluent mixture from a reforming reactor having pentane as its lightest component in substantial quantities. The term low pressure as used to describe the conditions in a reforming reactor is hereby defined to mean maintaining a pressure range from about 50 p.s.i.g. to about 300 p.s.i.g. in said reforming reactor. The term substantially pure hydrogen as used to describe the input hydrogen to a reforming reactor is hereby defined to mean a gas stream having hydrogen purities at least of about 85 mole percent and preferably of at least about 95 mole percent. The term liquid hourly spaced velocity (LHSV) is hereby defined to mean the charge rate of feed stock in volumes per hour divided by the volume of catalyst that said feed stock contacts. Of course, the said volumes must be in the same units.

The hydrocarbon stocks that can be converted in accordance with our process comprise hydrocarbon fractions containing naphthenes and paraffins. The preferred stocks are those consisting essentially of naphthenes and paraffins although, in some cases, aromatics and/or olefins may also be present. This preferred class includes straight run gasolines, naphthas, natural gasolines, and the like. It is frequently advantageous to charge thermally or catalytically cracked gasolines in mixtures with straight run gasoline. The gasoline charge stock may be a full boiling range gasoline having an initial boiling point of from about 50° F. to about 250° F. and an end boiling point within the range from about 200° F. to about 425° F. or a lighter fraction such as $C_6$'s and $C_7$'s etc.

The reforming catalysts that can be used in my process comprise catalysts that will promote the reactions hereinbefore described. One preferable type comprises a catalyst containing at least one refractory oxide support, a halogen and a metal selected from the group consisting of the metals and the compounds of the metals in the platinum group. In general, these preferable catalysts are capable of promoting hydrocracking, isomerization and even dehydrocyclization of paraffins and dehydrogenation of naphthenes. The active metal components that may be used in the catalyst are selected from the metals and compounds of the metals, ruthenium, rhodium, palladium, osmium, iridium and platinum. Platinum containing catalysts on a suitable support may be used in this invention. Preferred types of catalysts for use in my process comprise alumina, platinum and combined halogen, especially combined fluorine and/or combined chlorine. Catalysts of this type are described in detail in U.S. Patent No. 2,479,109, issued Aug. 16, 1949. They are prepared by forming a mixture of alumina and a halogen compound, the halogen being in an amount of from about 0.05% to about 3% by weight of said alumina on a dry basis, and thereafter compositing about 0.01% to about 2.0% by weight of platinum with the mixture and subsequently heating the composite.

Another group of catalysts that promote both hydrocracking and dehydrogenation reactions and that may be used in the present process comprises a cracking component and a metal component selected from the metals and compounds of metals that promote hydrogenation reactions. Such metal components comprise nickel, cobalt, iron, molybdenum, palladium and platinum. The cracking component ordinarily will comprise silica and at least one other metal oxide usually selected from the group consisting of alumina, zirconia, magnesia and thoria. The cracking component may also comprise alumina-boron oxide composites.

The reforming process may be carried out by contacting a hydrocarbon charge stock with a reforming catalyst in the presence of hydrogen. The mole ratio of hydrogen to hydrocarbon in the reforming reactor containing reforming catalyst is an important process variable and should be maintained at least as high as 2 and preferably within the range of 3 or 4 up to 20. A preferable arrangement is the loading of reforming catalyst into a fixed bed and simultaneously passing said charge stock and said hydrogen cocurrently over said fixed catalyst bed at reforming conditions of pressure, space velocity and temperature. Pressure ranges of from about 200 p.s.i.g. to about 800 p.s.i.g. and preferable ranges of from about 200 to about 500 p.s.i.g. are commonly employed in conventional reforming units. Temperature ranges of from about 800° F. to about 1050° F. and preferable ranges of from about 850° to about 1025° F. are commonly employed in conventional units. Liquid hourly space velocities ranges of from about 0.5 to about 5.0 and preferable ranges of from about 1.0 to about 3.0 are commonly employed in conventional units. The selection of the appropriate values for the above operating variables depend primarily upon the composition of the charge stock, the boiling range of the charge stock and the desired octane number of the reformate. Generally stocks with a low paraffin content as, for example, Mid-Continent stocks and California stocks (less than 50% paraffins) are easier stocks to achieve a given octane number. Their high naphthene content enables the rapid dehydrogenation reaction to be primarily responsible for the increase in octane. These stocks will generally be operated at higher space velocities. Stocks with high paraffin content as, for example, Kuwait stocks (about 80% paraffins) are more difficult to reform thus requiring lower space velocities. Likewise when processing heavy stocks it is preferable to operate at higher reactor pressures to reduce the carbonaceous forming reactions since it is easier to form these deposits from materials which already are heavier and contain more carbon atoms per molecule.

The 95% point on an Engler distillation curve has been used to characterize the charge stock in correlating with reactor pressure. This particular point is chosen since it meaningfully characterizes the heavier hydrocarbons present in the feed stock for the heavier the hydrocarbons present the higher the required pressure. In essence this invention comprises low pressure reforming in the presence of substantially pure hydrogen. Although there is a fairly wide range of low pressures (50 to 300 p.s.i.g.) as compared to the normal reforming pressure range (200 to 800 p.s.i.g.) and this tends to cause an overlap of the low pressure range with the normal pressure range, this overlap is avoided when correlating the specific low pressure with the 95% point of the charge stock. Thus, a conventional reformer might be operated at from 200 to 300 p.s.i.g. with a very light charge stock and at from 400 to 800 p.s.i.g. with a heavy charge stock. The present invention allows the shifting downward of the pressure for all these types of charge stocks into ranges previously considered uneconomical and even inoperative unless a swing reactor bed system with frequent regeneration was employed. It is thought that when substantially pure hydrogen is passed cocurrently through the catalyst bed along with the charge stock the low concentration of light hydrocarbons minimizes the carbonaceous deposit forming reactions which permits stable low pressure operation. Since this hydrogen is substantially pure there will be few, if any, light hydrocarbon impurities in the reactants charged to the catalyst which will reduce the amount of these light hydrocarbons that enter into the reactions which occur in the catalyst bed. Therefore, it is now possible to reduce the pressure which promotes the desirable dehydrogenation and dehydrocyclization reactions. It has also unexpectedly been found that the ratio of isopentane to normal pentane has increased in the reformate. These factors make it easier to obtain the desired octane number of the reformate which reduces the amount of required hydrocracking and increases the $C_5+$ yield of reformate.

It is felt that the relationship between the pressure selected and the charge stock boiling point is best described by equations. It has been found that the upper pressure relationship is $y=0.833x-14$, the lower pressure relationship is $y=x-150$ and the preferred pressure relationship is $y=1.28x-190$ where $x$ is the temperature in ° F. of the 95% point of the charge stock on the Engler distillation curve being limited from 200° F. up to 400° F. and $y$ is the pressure in the reforming reactor in p.s.i.g. being limited from 50 to 300 p.s.i.g. If charge stocks having a 95% point less than 200° F. are employed, it is preferred that a pressure of from 50 to 100 p.s.i.g. be employed. The following examples are shown in Table I to illustrate the use of these equations to select the pressure to be used with a particular charge stock.

TABLE I

| 95% Point ° F. of charge stock | Upper Pressure Limit, p.s.i.g. | Lower Pressure Limit, p.s.i.g. | Preferred Pressure, p.s.i.g. |
|---|---|---|---|
| 250 | 193 | 100 | 120 |
| 300 | 233 | 150 | 183 |
| 350 | 276 | 200 | 248 |
| 400 | 300 | 250 | 300 |

Thus, for example, if a charge stock having a 300° F. 95% point is employed, the pressure should be selected within the range of from 150 p.s.i.g. up to 233 p.s.i.g. and preferably about 183 p.s.i.g. If the 95% point is less than 200° F. then any convenient pressure from 50 p.s.i.g. up to 100 p.s.i.g. may be employed. If the 95% point is from 380° F. up to 400° F. then a pressure of 300 p.s.i.g. should be employed. By staying within the upper and lower pressure range improved reforming operations, i.e. higher $C_5+$ yields, are obtained.

The substantially pure hydrogen may be obtained from any well-known hydrogen manufacturing process or may be produced by treating of the recycle gas. One example of such a process is the dehydrogenation and cracking of light hydrocarbons such as methane, ethane, etc., over a catalyst comprising at least one dehydrogenation material such as nickel, iron, palladium or platinum on an alumina, or silica support or mixtures thereof at low pressures and temperatures of from 1300° F. to 1600° F. to produce a substantially pure hydrogen effluent. Another example of such a hydrogen manufacturing process is the steam-methane reforming process for the production of hydrogen. Recycle gas may be purified by low temperature separation or adsorption on a sorbent selective for light hydrocarbons such as activated carbon, activated alumina, silica gel, molecular sieves, etc. The source of the hydrogen, however, is not critical as long as it is substantially pure. It is also possible to satisfy the $H_2$ hydrocarbon ratio partially from recycle gas and partially from a once through stream as long as the combined gas stream is substantially pure as defined herein. By substantially pure, we mean hydrogen purities of at least 85% by volume and preferably at least 95% by volume. When processing once-through either wholly or in part, the effluent normally gaseous stream comprising hydrogen, methane, ethane, propane, etc., will still be relatively pure in hydrogen and may be used for further processing such as in a hydrorefining process unit, a dehydrodealkylation process unit, and/or a hydrocracking unit or the effluent may be recycled back to the hydrogen manufacturing process where the hydrogen may be extracted from the light hydrocarbons and thereupon returned to the reforming unit.

The following examples are presented to further illustrate the invention but it is not intended to limit the invention to the operating conditions or charge stock shown therein.

Example I

A reforming catalyst comprising 0.75% by weight platinum and 0.9% by weight chlorine on alumina weighing 52.5 grams and occupying a volume of 100 cc. was loaded into a block type isothermal reactor. The reactor was part of a pilot plant having additional auxiliary equipment comprising a high pressure separator, a debutanizer fractionating column, a recycle separator gas compressor and a charge pump. The catalyst was prereduced and predried and was brought up in temperature to 700° F. in the presence of a hydrogen purge stream. A desulfurized light Kuwait naphtha having a 160° F. initial boiling point, a 238° F. 95% point, a 276° F. end point, a 98.1 molecular weight, a 69.5° API specific gravity, a paraffin content of 79% by volume, a naphthene content of 17% by volume, an aromatic content of 4% by volume and having an octane number of 50 F–1 clear was introduced into said reactor at a rate of 100 cc./hr. while maintaining a pressure of 200 p.s.i.g. and a 10 gas/oil mole ratio by means of a separator recycle gas compressor with no treatment of the recycle gas in the reactor. The temperature of the reactor was thereupon increased until the debutanized reformate had an F–1 clear octane number of about 94.5. The charge stock was continually processed over the catalyst until 3.75 barrels of charge stock per pound of catalyst (b.p.p.) had been passed over said catalyst. During this period, the temperatures were adjusted upward daily in order to maintain a debutanized reformate of about 94.5 F–1 clear octane number. It is estimated that the catalyst deactivation rate which can be measured by the change in temperature divided by the change in catalyst life (° F. per barrel of charge stock per pound of catalyst) at said 3.75 b.p.p. was about 7.3° F./b.p.p. A material balance was made around the pilot plant at this point in time and the operating conditions and the results are presented in column 1 of Table II. After completing the run, the pilot plant was shut down and the catalyst was removed from the reactor.

Example II

Another batch of the same catalyst as used in Example I weighing 51.3 grams and occupying a volume of 100 cc. was loaded into the same reactor located in the same pilot plant. This plant was started up in the same manner as in Example I and the same charge stock was processed over the catalyst. However, the reactor was maintained at 100 p.s.i.g. and cylinder grade hydrogen having a hydrogen purity of at least 99 mole percent was processed once through said reactor. The recycle compressor was turned off and the total effluent gas was removed from the pilot plant. The plant was allowed to run for 1.7 b.p.p. while maintaining the debutanized reformate at about 94.5 F–1 clear octane number. As before, the temperatures were adjusted upward to maintain said octane number. During this period of time the rate of introduction of hydrogen into the reactor was maintained at a rate sufficient to give a hydrogen to hydrocarbon mole ratio of 10. It is estimated that the catalyst deactivation rate at said 1.7 b.p.p. was about 1.3° F./b.p.p. A material balance was made around the pilot plant at this point in time and the operating conditions and the results are presented in column 2 of Table II.

Example III

The plant was operated as described in Example II with the same catalyst until a catalyst life of 2.63 b.p.p. had been accumulated. Thereupon the rate of introduction of hydrogen was decreased so as to give a hydrogen to hydrocarbon mole ratio of about 6 in said reactor. The plant was lined out and operated to produce a 94.5 F–1 clear octane number debutanized reformate until a total of 3.74 b.p.p. of catalyst life had accumulated. Thereupon a material balance was made around the pilot plant at this point in time and the operating conditions and the results are presented in column 3 of Table II. It is estimated that the catalyst deactivation rate at said 3.74 b.p.p. was about 5.0° F./b.p.p.

TABLE II

| | Example I [1] | Example II [2] | Example III [2] |
|---|---|---|---|
| Operating Conditions in Reactor: | | | |
| Pressure, p.s.i.g. | 200 | 100 | 100 |
| Average Catalyst Temp., ° F. | 933 | 906 | 910 |
| Liquid Hourly Space Velocity, l./hr. | 0.95 | 1.00 | 1.02 |
| Hydrogen/Hydrocarbon, mole ratio | 7.0 | 9.7 | 5.3 |
| Total Gas/Hydrocarbon, mole ratio | 10.5 | 9.7 | 5.3 |
| Catalyst Life, b.p.p. | 3.75 | 1.70 | 3.74 |
| Catalyst Deactivation Rate, ° F./b.p.p. | 7.3 | 1.3 | 5.0 |
| Reformate Produced: | | | |
| Octane Number F–1 Clear | 93.5 | 94.5 | 94.2 |
| $C_5+$ Yield, volume percent of feed | 65.5 | 67.6 | 70.1 |
| Other Products: | | | |
| Hydrogen, s.c.f./bbl. of feed | 820 | 1400 | 940 |
| Methane, s.c.f./bbl. of feed | 117 | 155 | 141 |
| Ethane, s.c.f./bbl. of feed | 172 | 159 | 176 |
| Propane, s.c.f./bbl. of feed | 185 | 119 | 125 |
| Butane, volume percent of feed | 13.6 | 12.7 | 10.7 |
| Isopentane, volume percent of feed | 6.6 | 10.6 | 8.4 |
| Normal Pentane, volume percent of feed | 4.7 | 3.9 | 4.6 |
| Isopentane/Normal Pentane Ratio | 1.41 | 2.72 | 1.82 |

[1] Normal recycle operation.
[2] Substantially pure hydrogen.

Examination of the results of the three examples show several significant effects. One result is that there is an increase in $C_5+$ yield (pentane and heavier components) for both the 10 and 6 hydrogen to oil 100 p.s.i.g. substantially pure hydrogen runs over the conventional 200 p.s.i.g. recycle run while also producing a slightly higher octane number reformate. Another result is that even with this higher $C_5+$ yield the deactivation rates of both of said substantially pure hydrogen runs are lower than the normal recycle run. A third significant result is the higher isopentane ratio to normal pentane ratio in the substantially pure hydrogen runs. It is also apparent that the hydrogen purities of the effluent gases are substantially similar and all could equally well be used as a source of hydrogen for other processing. It is also significant that the propane and butane yields for the substantially pure hydrogen runs are lower than the recycle operation while the hydrogen yield is higher. Hydrogen is a valuable product and it is preferable to produce more $C_5$ and heavier rather than $C_3$ or $C_4$ components.

Example IV

Another run was made with a fresh batch of catalyst using the once-through hydrogen operation described in Example II with a 238° F. 95% point light Kuwait naphtha. Again the temperatures were adjusted to maintain a 94.5 F–1 clear octane number. The plant was operated at a 1.0 LHSV, a hydrogen to oil mole ratio of 5.0, and a pressure of 100 p.s.i.g. A catalyst deactivation rate of about 6.3° F./b.p.p. was obtained during this run for the first 4.28 b.p.p. of catalyst life. At this point all the above conditions were held constant and methane was injected along with the hydrogen into the reactor at such a rate as to maintain a mole ratio of $H_2/CH_4$ of 3/1. As a result of this change, the catalyst deactivation rate increased so rapidly that the temperatures could not be adjusted fast enough to maintain the reformate octane number at 94.5. On the basis of temperature requirement, adjusted to convert the as produced reformate from its actual octane number to 94.5, it is estimated that the catalyst reactivation rate was increased from 6.3° F./b.p.p. to 295° F./b.p.p. as a result of the methane injection. The run was terminated and a residue of material identified as polynuclear aromatics was found in the reactor outlet. This example shows the strong carbonaceous forming reactions that are promoted by the presence of appreciable amounts of light hydrocarbons in a reforming reactor maintained at low pressures.

We claim as our invention:

1. A process for the reforming of a gasoline boiling range hydrocarbon charge stock containing paraffins and naphthenes which comprises:

introducing said hydrocarbon charge stock and a substantially pure hydrogen stream into a reforming reaction zone containing a platinum group metal reforming catalyst, said zone being maintained at reforming reaction conditions including a temperature of about 800° F. to about 1050° F., a hydrogen to hydrocarbon mole ratio of about 3 to about 20, and a LHSV of about 0.5 to about 5; and maintaining a reactor pressure selected within the range bounded by the equations $y=0.833x-14$ and $y=x-150$ where $x$ is the temperature in ° F. of the 95% point of the charge stock on an Engler distillation curve being limited to a maximum of about 400° F. and $y$ is the pressure in p.s.i.g. being limited from 50 to 300 p.s.i.g., said reforming conditions and pressure being selected to produce a reformate having an F–1 clear octane number greater than about 90.

2. The process of claim 1 further characterized in that the catalyst comprises platinum in an amount from 0.01 to about 2% by weight, combined halogen selected from chlorine, fluorine and mixtures thereof in an amount from 0.05 to about 3% by weight and an alumina support.

3. The process of claim 2 further characterized in that the pressure is maintained at from about 50 to about 100 p.s.i.g. when the 95% point on an Engler distillation curve of the charge stock is less than 200° F.

4. The process of claim 2 further characterized in that the reactor pressure is maintained at values of about those calculated by the equation $y=128x-190$ where $x$ is the 95% point in ° F. on the Engler distillation curve of the charge stock being limited from 200 to 400° F. and $y$ is the pressure in p.s.i.g. being limited from 50 to 300 p.s.i.g.

5. The process of claim 4 further characterized in that the actual hydrogen purity of the substantially pure hydrogen stream is above 95 mole percent.

6. The process of claim 2 further characterized in that an effluent is withdrawn from the reaction zone, cooled and separated into a normally gaseous fraction and a normally liquid fraction, and the normally gaseous fraction is treated to remove at least a portion of light hydrocarbons therefrom producing thereby said substantially pure hydrogen stream.

7. The process of claim 2 further characterized in that at least a portion of substantially pure hydrogen stream is derived from an outside source of hydrogen, said stream being processed at least in part once-through the reforming zone.

8. The process of claim 1 further characterized in that said reforming reaction conditions include a temperature of about 850° F. to about 1025° F. and a LHSV of about 0.5 to about 3.

References Cited

UNITED STATES PATENTS

| | | | |
|---|---|---|---|
| 2,864,761 | 12/1958 | D'Ouville et al. | 208—138 |
| 2,909,480 | 10/1959 | Henke | 208—138 |
| 2,920,033 | 1/1960 | Beavon | 208—134 |
| 3,008,895 | 11/1961 | Hansford et al. | 208—112 |
| 3,011,967 | 12/1961 | Schmitkons et al. | 208—139 |
| 3,024,186 | 3/1962 | Newby et al. | 208—139 |
| 3,189,538 | 6/1965 | Pohlenz et al. | 208—60 |
| 3,258,420 | 6/1966 | Dalson et al. | 208—138 |

HERBERT LEVINE, *Primary Examiner.*

DELBERT E. GANTZ, *Examiner.*